June 14, 1966 W. A. TAM 3,255,610
GAS EXPANSION APPARATUS
Filed Dec. 22, 1964 3 Sheets-Sheet 2

INVENTOR.
William A. Tam
By Merriam, Smith & Marshall
ATTORNEYS.

June 14, 1966  W. A. TAM  3,255,610
GAS EXPANSION APPARATUS
Filed Dec. 22, 1964  3 Sheets-Sheet 3

INVENTOR.
William A. Tam
By Merriam, Smith & Marshall
ATTORNEYS.

large ends of the rotating members and its tem-
United States Patent Office 3,255,610
Patented June 14, 1966

3,255,610
GAS EXPANSION APPARATUS
William A. Tam, Westmont, Ill., assignor to Chicago Bridge & Iron Company, Oak Brook, Ill., a corporation of Illinois
Filed Dec. 22, 1964, Ser. No. 420,386
12 Claims. (Cl. 62—401)

This invention relates generally to a thermodynamic process and apparatus for heating or cooling purposes and more particularly to the method and apparatus wherein gas molecules are mechanically accelerated in a centrifugal field to obtain either a heating effect or refrigeration effect.

Prior art patents, United States Letters Patents issued to John R. Roebuck, No. 2,393,338 and No. 2,451,873, disclose compressing gas by subjecting the gas to centrifugal action in a rotating unit. Preferably, during the course of compression, a heat transfer medium is passed in heat exchange relationship with the gas so that the compressed gas is at a temperature lower than the temperature which it otherwise would attain. The compressed gas is then expanded and relatively low temperatures are obtained. It is apparent upon review of these prior art disclosures that the devices shown therein are quite expensive due to the amount of material and labor involved in their construction. Moreover, the peripheral velocities required for the cooling effect to become significant prohibit the construction of the Roebuck machine with existing materials.

Additionally, cascade or expansion systems which are also commercially available, are deficient due to the low efficiencies achievable with these systems. I have been able to overcome these deficiencies with a vortex expansion unit which permits heat transfer at a high efficiency but at reduced costs compared to units and systems presently available.

In my invention, which will be described as embodied in a refrigeration process, an inner frusto conical member having cooling liquid headers located on the outer wall thereof is spaced from the outer wall of an enclosing outer frusto conical member so that an annular space is formed between the inner and outer members. In operation, both members rotate in the same direction.

Gas enters the annular space at the smaller diameter ends of the rotating members. As the gas moves outwardly traveling in the annular space along the longitudinal length of the respective members, it is compressed. Cooling liquid passing through the headers located along the length of the inner member is in a heat exchange relationship with the gas and serves to cool the gas during the course of compression. Subsequently, the compressed gas expands into an expansion chamber located at the large ends of the rotating members and its temperature is reduced to a desired temperature after which the gas exits from the apparatus to be stored until needed or employed for a particular function, e.g., to be used as a heat transfer medium.

Other features and advantages are inherent in the structure claimed and disclosed as will be apparent to those skilled in the art from the following detailed description in conjunction with the accompanying drawings wherein:

Figure 1:
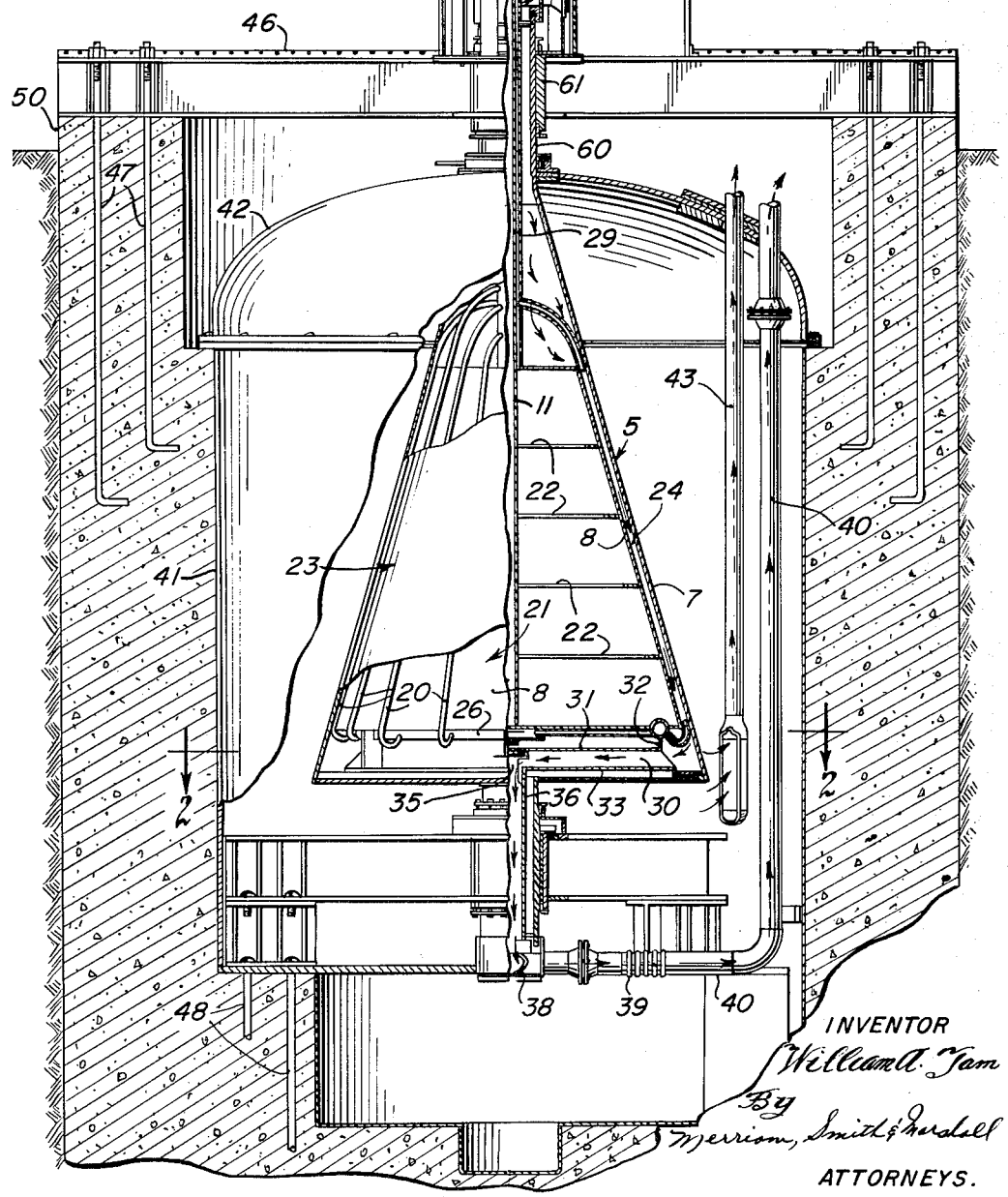
FIGURE 1 shows a front view of my gas vortex expansion unit located within a vacuum shroud beneath the ground.

Viewing FIGURE 1, there is shown a vortex expansion unit 5 located beneath the ground surface. The unit could be located in other environments, however for purposes of illustration, soil has been excavated from the ground and unit 5, which is disposed within a vacuum chamber 41, is positioned in the excavation. A lining wall 50 is disposed about the vertical wall of the excavation and suitable insulation material is packed in the space formed between chamber 41 and lining wall 50.

Unit 5 comprises a pipe 10 have a rotary joint 9 attached to one end of the pipe 10, joint 9 being suitably connected to cooling medium inlet and outlet lines, not shown. Steam turbine 12 or other suitable drive means has shaft 13 coupled to input shaft 14 of a gear train enclosed within gear housing 17. Gears fixed on input shaft 14 mesh with gears attached to pipe 10 such that upon rotation of shaft 13, pipe 10 also rotates.

Extending from pipe 10 are cooling gas headers 20 which slope outwardly and downwardly at a selected angle from pipe 10, the headers abutting or being attached to the outer wall 8 of inner frusto conical member 21. Inner member 21 slopes outwardly as shown in FIGURE 1 with the reduced diameter end of the member being positioned nearest the ground surface. The conical wall of the inner member is structurally reinforced by means of stiffener rings or ribs 22 which connect outer wall 8 to the outer surface of pipe 11.

Disposed about headers 20 is an outer frusto conical member 23 having outer wall 7, the outer member being spaced from inner member 21 to form an annular space 24 between walls 8 and 7. The width of the annular space 24 is about at least as wide as the diameter of headers 20.

Figure 2:
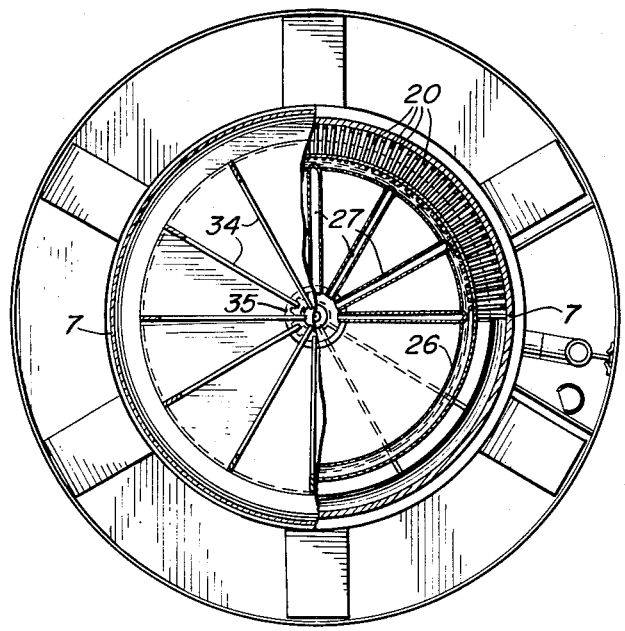
FIGURE 2 is a sectional view taken along lines 2—2 in FIGURE 1, showing the arrangement of the liquid headers at the large diameter end of each of the respective frusto conical members.

Headers 20 are attached at their inlet ends to ring manifold 26. Also attached to manifold 26 are inlet headers 27, FIGURE 2, which connect the manifold to pipe 11.

Pipe 10 encloses pipe 11 for a major portion of the length of pipe 11. Pipe 11 has an opening at its one end 28 wherein a cooling medium is adapted for entry into the unit 5. The cooling medium enters at 28 and passes through pipe 11 into headers 27. From headers 27, the medium passes into ring manifold 26 and then enters the individual headers 20. Each header outlet terminates into pipe 10, the inner surface of pipe 10 and exterior surface of pipe 11 forming an annular space 29 through which the heat transfer medium flows following a heat exchange with the gas to be cooled. The medium then flows from the apparatus out of outlet 6 located in rotary joint 9.

The outer frusto conical member 23 is sloped at substantially the same angle as member 21 but, as shown in FIGURE 1, extends further in length at its large diameter end than member 21. The small end of outer member 23 is joined to one end of tubular member 60, whose longitudinal axis is co-axial with the longitudinal axis of pipes 10 and 11. Member 60 is positioned within a guide and thrust bearing 61. The remaining end of member 60 is connected to a sealed gas inlet line 62.

At the large end of member 23, an expansion chamber 30 is formed. Plate 31 is welded or connected by suitable means to spacer ring 32 which is connected to manifold ring 26. A second plate 33 having a central opening 35 is spaced from plate 31 by means of vanes 34. One side of a vane 34 is welded to one plate while the remaining side of the vane is welded to the other plate as shown in FIGURE 1. The central opening 35 in plate 33 is connected in a leak-tight connection to the inlet of tubular member 36. Member 36 is positioned within thrust and guide bearing 37 which, like bearing 61, supports unit 5 for rotation. The outlet end of member 36 is connected to a cooled gas outlet 38 which is connected by expansion joint 39 to gas outlet line 40.

In order to avoid any aerodynamic heating effect between the rotating apparatus and any surrounding gas, both members 21 and 23 are enclosed within vacuum chamber 41 which is covered by vacuum hood 42. Gas outlet line 43 is attached to a suitable pump means, not shown, for producing a vacuum within chamber 41.

The apparatus is suspended from a support assembly having support arms 45 over which metal grating 46 is laid. Each of the arms extends radially outward, and is connected to a common support collar. Anchoring bolts 47 which are located near the outboard end of the individual support arms serve to firmly anchor the assembly within the insulating material packed within the space formed by chamber 41 and lining wall 50. Additional anchoring rods 48 are employed at the bottom of the structure to further assist in anchoring the apparatus.

Although the apparatus has been shown with the longitudinal axes of the cones in a co-axial vertical position, the cone members could be placed in other positions, e.g., horizontal, to achieve the desired performance.

Further, for clarity in showing the invention, miscellaneous valves, lubrication lines, seals and the like have been deleted from the drawings, but necessary valves and the like may readily be adapted to the unit without the exercise of invention.

In operation, gas to be cooled enters the gas vortex expansion unit 5 from line 62 into the annular space formed by member 60 and pipe 10 where it proceeds to the reduced end of member 23. Members 21 and 23 rotate in the same direction at peripheral velocities of about 1100 feet per second, the precise velocity depending upon the molecular weight of the gas circulated. During rotation, the gas is centrifugally urged outwardly in the annular space 24 formed by cone walls 7 and 8. As the gas travels outwardly along the length of members 21, 23 in its compression step, it is in a counter-current heat exchange relationship with a cooling medium which enters pipe 11 at 6. The medium passes through headers 27 and ring manifold 26 and is then directed upwardly through headers 20 where, subsequent to its heat exchange with the gas to be cooled, it flows in the annular space formed by the interior surface of pipe 10 and exterior surface of pipe 11 after which it is exhausted from the system at 6.

Following centrifugal compression, the gas is then expanded into expansion chamber 30 with attendant cooling where its temperature is reduced to that desired for a particular purpose, the gas then leaving the apparatus through outlet 38 and line 40.

Figure 4:
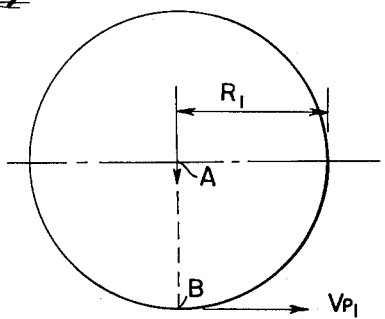
FIGURE 4 shows a view illustrating the compression of a molecule of gas in the expansion unit; and, FIGURE 5 shows another view illustrating the expansion of a molecule of gas in the vortex expansion unit.
Figure 3:
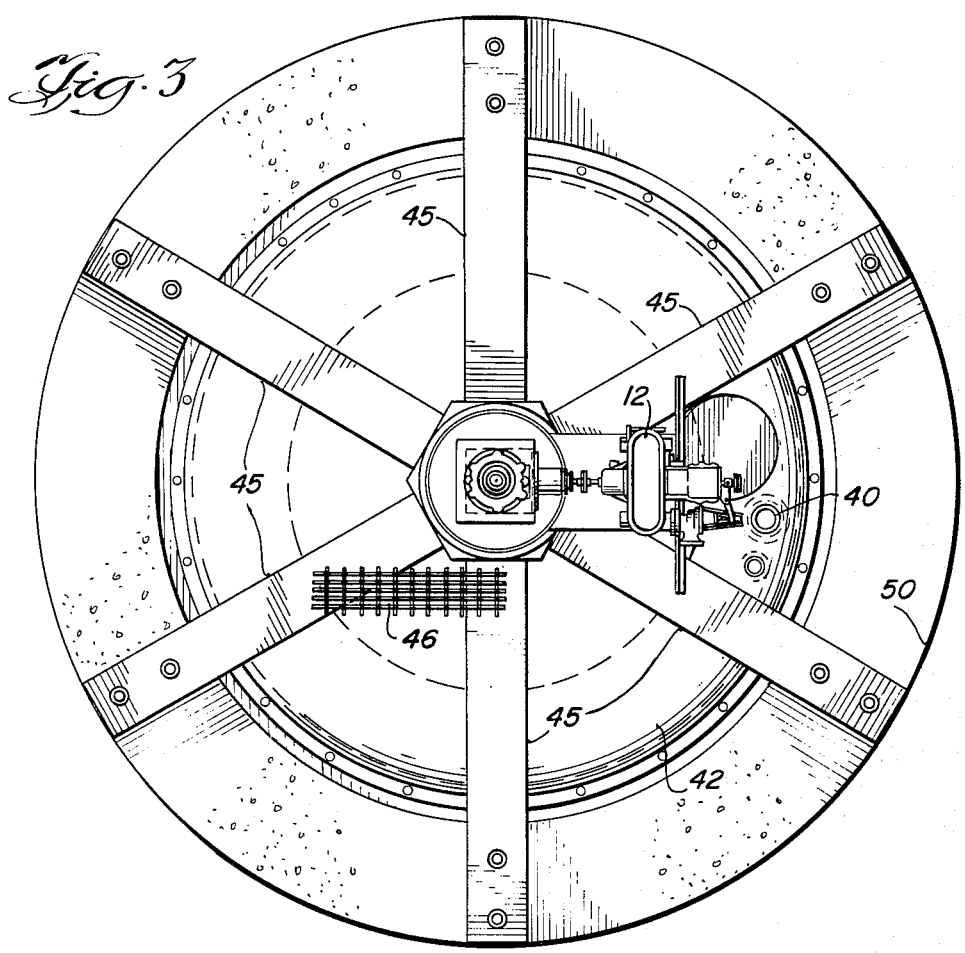
FIGURE 3 is a top view showing a portion of the supporting structure for the vortex expansion unit.
Figure 5:
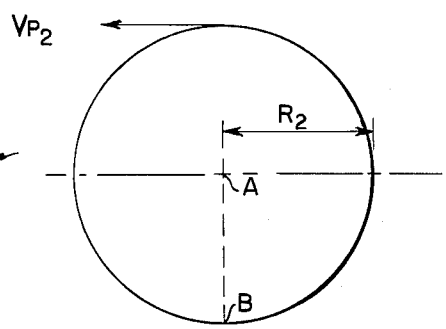

The operation of the vortex expansion unit 5 can further be understood by referring to FIGURES 4 and 5 of the drawings. In FIGURE 4, a molecule of gas enters at Point A and has a velocity $V_A$ due to its temperature. The force urging the molecule outwardly is 0 due to the centrifugal field at this point. However, any deviation from this point will cause the molecule to fall to the outside. Circumferential components result in no energy change and are not effective.

$$V_B{}^2 = V_A{}^2 + 2aR_1$$

where
$V_B$ = molecular velocity at point B
$V_A$ = molecular velocity at point A
$a$ = centrifugal acceleration
$R_1$ = radius of circle
$a$ can be estimated as $$\frac{V_p{}^2}{2R_1}$$

where $V_p$ = tangential velocity at B.
Therefore:

$$V_B{}^2 = V_A{}^2 + V_p{}^2$$

It is known that $V_A$ as a function of temperature is:

$$V_A = \left(\frac{8RT_A}{\pi M}\right)^{1/2}$$

Therefore:

$$V_B{}^2 = \frac{8RT_A}{\pi M} + V_p{}^2$$

For a particular gas, the values of R, the gas constant, and M the molecular weight of the gas, are known. Further the entry temperature $T_A$ can be measured and in addition the value of $V_p$ can be established for a given set of conditions. Therefore, assuming adiabatic compression, as there is no vane impeller acting on the gas, the value of $V_B{}^2$ can be determined. Knowing $V_B$ and that $$V_B{}^2 = \frac{8RT_B}{\pi M}$$

then $$T_B = \frac{V_B{}^2 \pi M}{8R_1}$$

where $T_B$ is the temperature of the gas following compression.

Applying the same treatment to the expansion end of the cycle as illustrated in FIGURE 5

$$V_A{}^2 = V_B{}^2 - V_p{}^2$$

$V_B{}^2$ was determined in the manner presented above
$V_p{}^2$ was established above for a given set of conditions
With $V_A{}^2$ known, then $$T_A = \frac{V_A{}^2 \pi M}{8R_2}$$

where $T_A$ is the temperature of the gas following expansion.

The above analysis has been based on the adiabatic compression of the gas; however, the analysis could also be carried out, if desired, based on isothermal compression.

The foregoing detailed description has been given for clearness of understanding only and no unnecessary limitations should be understood therefrom, as modifications will be obvious to those skilled in the art.

What is claimed is:

1. A thermodynamic apparatus for accelerating gas in a centrifugal field, said apparatus comprising:
    a first frusto conical member;
    a second frusto conical member enclosing said first member and spaced therefrom to form an annular space between said first and second members;
    an expansion chamber located at the large ends of said members, said annular space in communication with said expansion chamber;
    gas inlet means for allowing gas to enter said annular space;
    gas outlet means connected to said expansion chamber for removing gas; and,
    means for rotating said first and second members whereby said gas is urged centrifugally through said annular space and into said expansion chamber.

2. The apparatus of claim 1 further including at least one header means positioned within said annular space for passing a heat transfer medium therethrough in a heat exchange relationship with said gas.

3. A thermodynamic apparatus for accelerating a gas in a centrifugal field, said apparatus comprising:
    a first frusto conical member;
    a second frusto conical member enclosing said first member and spaced therefrom to form an annular space between said first and second members;
    an expansion chamber located at the large ends of said members, said annular space in communication with said expansion chamber;
    at least one header positioned within said annular space for passing a heat transfer medium through said header;

heat transfer medium inlet means attached to the inlet end of said header;

heat transfer medium outlet means attached to the outlet of said header;

gas inlet means for allowing gas to enter said annular space at the small ends of said members;

gas outlet means connected to said expansion chamber for removing gas; and, means for rotating said first and second members whereby gas is urged centrifugally through said annular space and into said expansion chamber.

4. A thermodynamic apparatus for accelerating a gas in a centrifugal field, said apparatus comprising:

a first pipe;

a second pipe enclosed by said first pipe for a major portion of the length of said second pipe;

a heat transfer medium inlet and outlet means located at one end of each of said pipes;

at least one header means attached to said first and second pipes;

a first member having an outer conical wall; in substantial contact with said header;

a second member having an outer conical wall enclosing said outer wall of said first member and spaced therefrom to form a gas passage between said walls;

an expansion chamber located at the large diameter ends of said members, said passage communicating with said chamber;

gas inlet means connected to the reduced diameter end of said second member for admitting gas into said gas passage;

gas outlet means attached to said chamber for removing gas from said chamber; and, means for rotating said first and second members whereby gas is urged centrifugally through said gas passage.

5. The apparatus of claim 4 further including a vacuum chamber for enclosing said apparatus and means for drawing a vacuum within said chamber.

6. The apparatus of claim 4 further including stiffening ribs connecting said outer wall of said inner member to said second pipe.

7. The apparatus of claim 4 further including vane means located within said expansion chamber for directing said gas in said chamber to said gas outlet means.

8. An apparatus for accelerating a gas in a centrifugal field, said apparatus comprising:

a first pipe;

a second pipe enclosed by and spaced from said first pipe for a major portion of the length of said second pipe the space between said first and second pipes forming a heat transfer medium outlet;

a first member having an outer conical wall connected to said second pipe;

a second member having an outer conical wall enclosing said outer wall of said first member and spaced therefrom to form a gas passage space between said walls;

a plurality of headers disposed within said gas passage space;

a ring manifold connected to one end of each of said headers, the remaining end of each of said headers being connected to said first pipe and communicates with said heat transfer medium outlet;

an expansion chamber located at the large ends of said members, said annular space communicating with said chamber;

a gas outlet means attached to said chamber for removing gas from said chamber;

gas inlet means connected to the reduced end of said second member for admitting gas into said gas passage space; and, means for rotating said first and second members whereby gas is urged centrifugally through said gas passage space.

9. The apparatus of claim 8 further including a vacuum chamber for enclosing said apparatus and means for drawing a vacuum within said chamber.

10. The apparatus of claim 8 further including stiffening ribs connecting said outer wall of said inner member to said second pipe.

11. The apparatus of claim 8 further including vane members located within said expansion chamber.

12. A thermodynamic apparatus for accelerating gas in a centrifugal field, said apparatus comprising:

a first frusto conical member capable of rotation;

a second frusto conical member capable of rotation enclosing said first member and spaced therefrom to form an annular space between said first and second members;

an expansion chamber located at the maximum diameter ends of said members, said annular space in communication with said expansion chamber;

gas inlet means for allowing gas to enter said annular space; and, gas outlet means connected to said expansion chamber for removing gas.

References Cited by the Examiner

UNITED STATES PATENTS

| | | | |
|---|---|---|---|
| 2,393,338 | 1/1946 | Roebuck | 62—86 |
| 2,451,873 | 10/1948 | Roebuck | 62—86 |
| 2,490,064 | 12/1949 | Kollsman | 62—401 |
| 2,511,691 | 6/1950 | Bramley | 62—87 |
| 2,520,729 | 8/1950 | Kollsman | 62—401 |
| 2,602,306 | 7/1952 | Japolsky | 62—402 |

FOREIGN PATENTS

| | | |
|---|---|---|
| 1,104,230 | 8/1955 | France. |

WILLIAM J. WYE, *Primary Examiner.*